United States Patent
Lefaure

(10) Patent No.: US 9,469,168 B2
(45) Date of Patent: *Oct. 18, 2016

(54) METHOD AND DEVICE FOR IDENTIFYING SENSORS HOUSED IN TYRES

(75) Inventor: Philippe Lefaure, Montbrun Lauragais (FR)

(73) Assignee: LDL Technology, Ramonville-Saint-Agne (FR)

( * ) Notice: Subject to any disclaimer, the term of this patent is extended or adjusted under 35 U.S.C. 154(b) by 1687 days.

This patent is subject to a terminal disclaimer.

(21) Appl. No.: 12/741,229

(22) PCT Filed: Nov. 12, 2008

(86) PCT No.: PCT/FR2008/052029
§ 371 (c)(1),
(2), (4) Date: Jun. 6, 2010

(87) PCT Pub. No.: WO2009/068808
PCT Pub. Date: Jun. 4, 2009

(65) Prior Publication Data
US 2010/0231370 A1    Sep. 16, 2010

(30) Foreign Application Priority Data
Nov. 12, 2007 (FR) ..................... 07 58961

(51) Int. Cl.
*B60Q 1/00* (2006.01)
*B60C 23/04* (2006.01)
(Continued)

(52) U.S. Cl.
CPC ......... *B60C 23/0416* (2013.01); *B60C 23/007* (2013.01); *B60C 23/008* (2013.01); *B60C 23/0433* (2013.01); *B60C 23/0444* (2013.01); *G01S 1/00* (2013.01); *H04W 4/00* (2013.01)

(58) Field of Classification Search
CPC .................................. H04W 4/00; G01S 1/00
USPC ................. 340/455, 438, 442; 73/146.2–146
See application file for complete search history.

(56) References Cited

U.S. PATENT DOCUMENTS 5,717,135 A * 2/1998 Fiorletta et al. ............. 73/146.5
6,362,731 B1 * 3/2002 Lill ............................... 340/445
(Continued)

FOREIGN PATENT DOCUMENTS

DE    10 2006 012534 A1    10/2006
EP          815638 A1 *    1/1998
(Continued)

OTHER PUBLICATIONS

International Search Report, May 6, 2009, from International Phase of the instant application.

*Primary Examiner* — Shirley Lu
(74) *Attorney, Agent, or Firm* — Paul & Paul

(57) ABSTRACT

The invention relates to a method of identifying sensors (C1, C2, C3, C4) of an information system for a vehicle (V1) of the type that links a plurality of sensors housed in the wheels and equipped with a subassembly for transmitting the collected data to a module (100) for transmitting and receiving said collected data, which is equipped with at least one transmission/reception antenna (110), in which each axle end is fitted with twin wheels, an inner wheel and an outer wheel, each wheel accommodating an equipped sensor (Ci or Ce) of a transmission subassembly, said method being noteworthy in that it consists in varying the power of the transmission antenna (110) in such a way that the transmission field of the antenna varies and includes or excludes the sensor(s) (Ci, Ce) located within its radius of action. The invention also relates to the device for implementing the method described above. Applications: detection and transmission of parameters from vehicle tires.

11 Claims, 3 Drawing Sheets

(51) Int. Cl.
*B60C 23/00* (2006.01)
*H04W 4/00* (2009.01)
*G01S 1/00* (2006.01)

(56) References Cited

U.S. PATENT DOCUMENTS

2002/0130771 A1 9/2002 Osborne et al.
2004/0189457 A1 9/2004 Watabe
2005/0156723 A1* 7/2005 Fujii .............................. 340/447
2006/0132325 A1 6/2006 Fujii et al.
2006/0214780 A1 9/2006 Mathias et al.

FOREIGN PATENT DOCUMENTS

| EP | 1 270 349 A | 1/2003 |
| EP | 1 419 908 A | 5/2004 |
| EP | 1 614 550 A | 1/2006 |

* cited by examiner

METHOD AND DEVICE FOR IDENTIFYING SENSORS HOUSED IN TYRES

FIELD OF THE INVENTION

This invention relates to the field of sensors housed in tyres and in particular to adaptations making it possible in the best conditions to differentiate them and to locate them once positioned.

DESCRIPTION OF PRIOR ART

Sensors positioned inside tyres of vehicles in order to measure and transmit data concerning the pressure, the temperature, etc. are known in prior art.

For this, each sensor placed in each tyre is conventionally provided with a radiofrequency transmitter for the purposes of wireless transmission of said data, to a receiver placed on the axle or on the frame of the vehicle. This receiver receives and decodes the informative signals transmitted by the transmitters of each wheel.

This type of equipment is described in the documents EP 1419908, US 2006/214780, DE 10 2006 012534 and US 2005/156723.

In certain vehicles such as heavy trucks as well as buses, the wheels are mounted in pairs on each axle end: it is then said that the wheels are twinned. For such an application, the use of the network of sensors described hereinabove, can have the difficulties which are described hereinafter.

The twinning of the wheels brings very close together the two sensors therein associated and it is difficult to differentiate the transmissions of these two sensors when stopped as well as during the operation of the vehicle without implementing encoding and identification techniques that are particularly complex and expensive.

For example, during the learning, i.e. during the phase of perfecting the information management system coming from the sensors when stopped, a simultaneous activation of the two sensors can be carried out involuntarily when they are interrogated by the operator by means of his electronic module for interrogating that he directs towards the outer tyre.

Likewise, during a phase of operating in movement, the vicinity of the sensors of the wheels of the same axle end makes it difficult to decrypt the messages due to the collision of the frames and due to the fact that the electromagnetic radiation transmitted by the sensors and received by the module for receiving is of the same power which inhibits the ability to receive the message (receiver is made blind).

DESCRIPTION OF THE INVENTION

Based on this established fact, the applicant has carried out research aimed at solving the difficulties observed in operating a system of sensors for vehicles that have twin wheels.

This research has resulted in the designing of a method and of a device for identifying sensors housed not only in twin wheels but also in separated wheels. This method and this device are very inexpensive and particularly easy to implement. They also do not require any modification of the existing communication technologies.

According to the invention, the method for identifying sensors of an information system for vehicle of the type of those associating a plurality of sensors housed in the wheels and provided with a subassembly for transmitting the collected information towards a module for transmitting and receiving the said collected information from at least one transmission/reception antenna, wherein each axle end is provided with twin wheels, an inner wheel and an outer wheel, each wheel accommodating a sensor provided with a subassembly for transmitting, is noteworthy in that it comprises varying the power of the transmission antenna in such a way that the transmission field of the antenna varies and includes or excludes the sensor(s) arranged in its radius of action in order to locate the source of the data received.

This characteristic is particularly advantageous in that it makes it possible to identify the sensors without having to use an encoding technology. Indeed, through deduction, the module for transmitting and receiving will receive one or several streams of data, with the one no longer being received (via a decrease in power) or received in addition (via an increase in power) able to be identified in relation to the others.

As such, although the document EP 1419908 comprises a solution for identifying the sensors, this method and this device do not constitute a solution within the framework of an application linked to twin wheels of the same axle end. Indeed, the shift formed by the difference present between two twin wheels is not sufficient to recreate the conditions of separation that are required for the transmission at rates or at a force that are different.

In addition, although the documents US 2006/0214780 and US 2005/0156723 describe the possibility of varying the power this variation does not have the objectives of the invention. As explained hereinabove, the small amount of distance materially separating the two sensors does not make it possible with an antenna, regardless of its position, to not receive the two signals from the two sensors.

As such, within the framework of an application with twin wheels, it is not possible to have available in all cases an antenna power that is adapted for the interrogation of a single sensor. Indeed, the power of the antenna making it possible to interrogate the farthest sensor will necessarily activate the nearest sensor since it is located in the vicinity.

Although in prior art this double activation constitutes a technical problem, it constitutes for the invention one of the signals for triggering the sought identification.

Indeed, the method of the invention is a method of identification that will vary the power of the antenna providing the transmission of the interrogation signal in such a way as to include or exclude the sensors. Using an antenna that is connected to the frame and increasing its power progressively, the activation of a first sensor followed by the activation of the two sensors makes it possible to identify said first sensor activated as the one installed in the inner wheel. On the contrary, using an antenna connected to the frame and progressively decreasing its power the activation of the two sensors then the activation (and therefore the reception of the signal) from a single sensor makes it possible to identify this single sensor activated as the one installed in the inner wheel.

This method can be associated with a judicious arrangement of the sensors. As such according to a particularly advantageous characteristic, the antenna is arranged in such a way that the sensors from which it must receive the data are positioned at a different distance from the antenna in such a way that the variation of the radiation even directed from the antenna makes it possible to include or exclude the sensors. Indeed, the decrease of an antenna radiation lobe excludes the sensors that are farthest from the antenna until the antenna is receiving only a single signal coming from the nearest sensor.

This technique is used in the method imagined by the applicant in application to twin wheels. This method of identifying sensors of an information system for vehicles of the type as that associating at least one sensor provided with a subassembly for transmitting the collected information to a module for transmitting and receiving said collected information, said module being associated to the frame of the vehicle and provided with an antenna, each axle end being provided with twin wheels, is noteworthy in that it comprises reducing the power of the antenna in such a way that when the power reaches a level sufficiently low, the nearest sensor (inner sensor) is then the only one to transmit and is therefore identified as the sensor of the inner wheel. The variation of the power of the antenna here makes it possible to locate the sensors of the two wheels arranged on the same axle end and therefore at a different distance from the frame and consequently from the antenna. This arrangement of the wheels makes it possible to make use of the method of the invention. The module can be associated with one antenna per axle or one antenna per axle end.

The invention also relates to a device making it possible to implement the method described hereinabove. This device is noteworthy in that it is comprised of an electronic circuit associating an antenna with a variable resistor of which the variation makes it possible to vary the Q-factor and therefore the gain of the antenna. The module for transmitting and receiving the data collected by the sensors incorporated into the wheels to which is associated the antenna can be supported by the frame of the vehicle for an operation in movement of the vehicle. The antenna of said module is then associated to the frame of the vehicle. The module for transmitting and receiving can be comprised of a fixed electronic module for interrogating inside a repair/learning zone of a garage or present in a portable case not associated with the frame used by an operator when the vehicle is stopped. The antenna is then associated with the portable case.

The basic concepts of the invention having just been exposed hereinabove in their most elementary form, other details and characteristics shall appear more clearly when reading the following description and with regards to the annexed drawings, provided by way of a non-restrictive example, an embodiment of a method and of a device in accordance with the invention.

DESCRIPTION OF PREFERRED EMBODIMENTS

Figure 1:
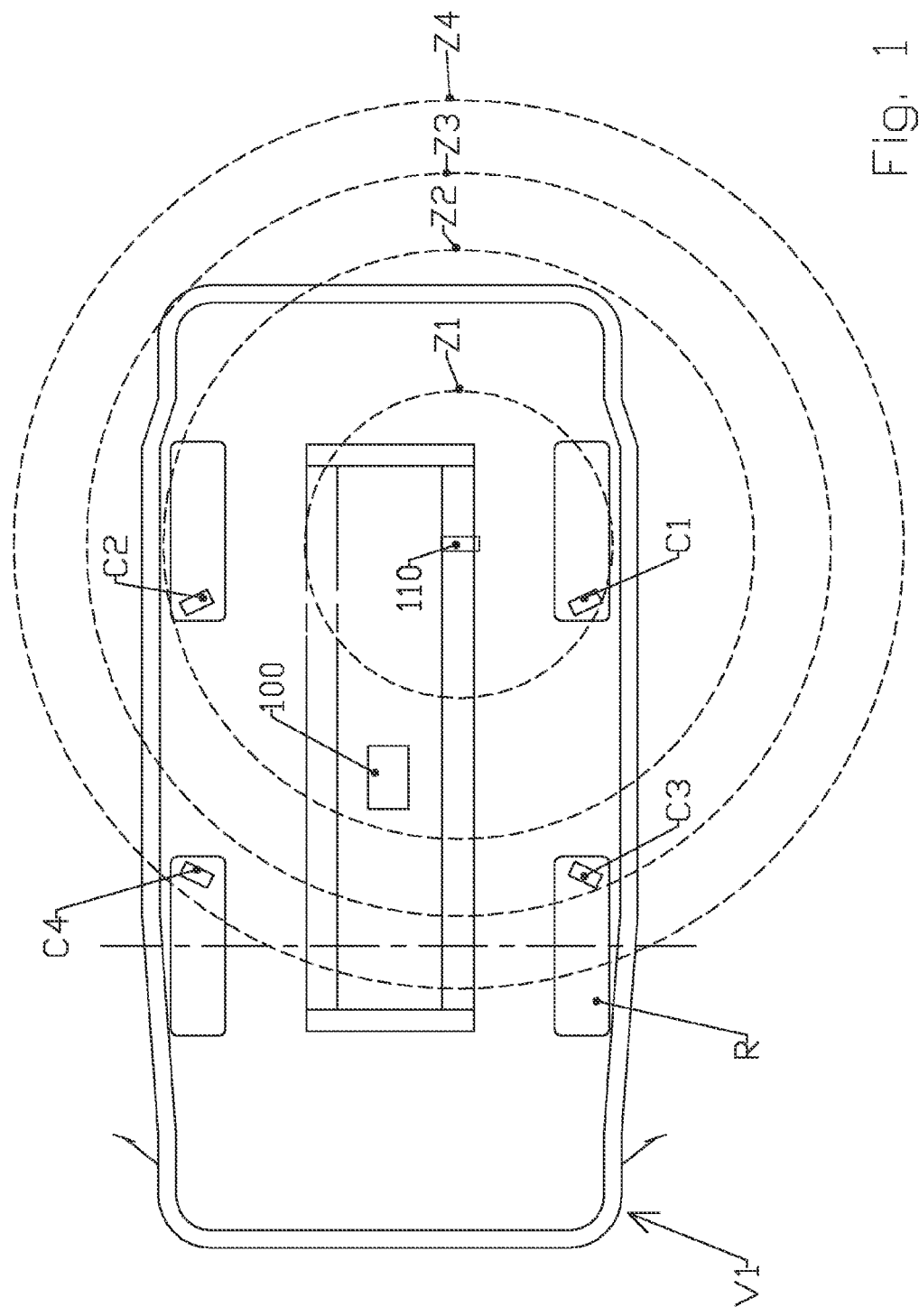
FIG. 1 shows an application of the method for a vehicle with four wheels.

Such as is shown in the drawing in FIG. 1, the vehicle V1 is provided with four wheels R in the tyres of each of which is arranged a sensor C1, C2, C3 and C4. The frame of the vehicle V1 is provided with a module for transmitting and receiving 100 associated with an antenna 110.

As shown, on the basis of an isotropic antenna, i.e. having a broadcast zone that is equivalent in all directions, the antenna 110 is placed on the vehicle in such a way as to be at a different distance from the wheels R and therefore from the sensors C1 and C2, C3 and C4. In accordance with the invention, the broadcasting power of the antenna will vary in such a way as to change the range of the broadcast zone so that it encompasses more or less sensors.

As such, as shown, a first broadcast zone Z1 makes it possible to activate and to receive the data coming from sensor C1 which is the closest to the antenna. By progressively increasing the power and therefore the gain, the antenna will activate and successively receive the data coming from the sensors that are farther and farther away. As shown, a second broadcast zone Z2 incorporates the sensor C2, then a third broadcast zone Z3 incorporates the sensor C3 and a fourth broadcast zone Z4 incorporates the sensor C4. At each variation, the presence of a signal or of an additional stream of data makes it possible to identify it as coming from a sensor that is farther away than the previous stream of data. As antenna 110 is arranged in such a way that the sensors are arranged at a different distance from the antenna of which the power is varying, it is then possible to identify each stream of data by locating each sensor.

This method remains the same by decreasing the power.

Figure 2:
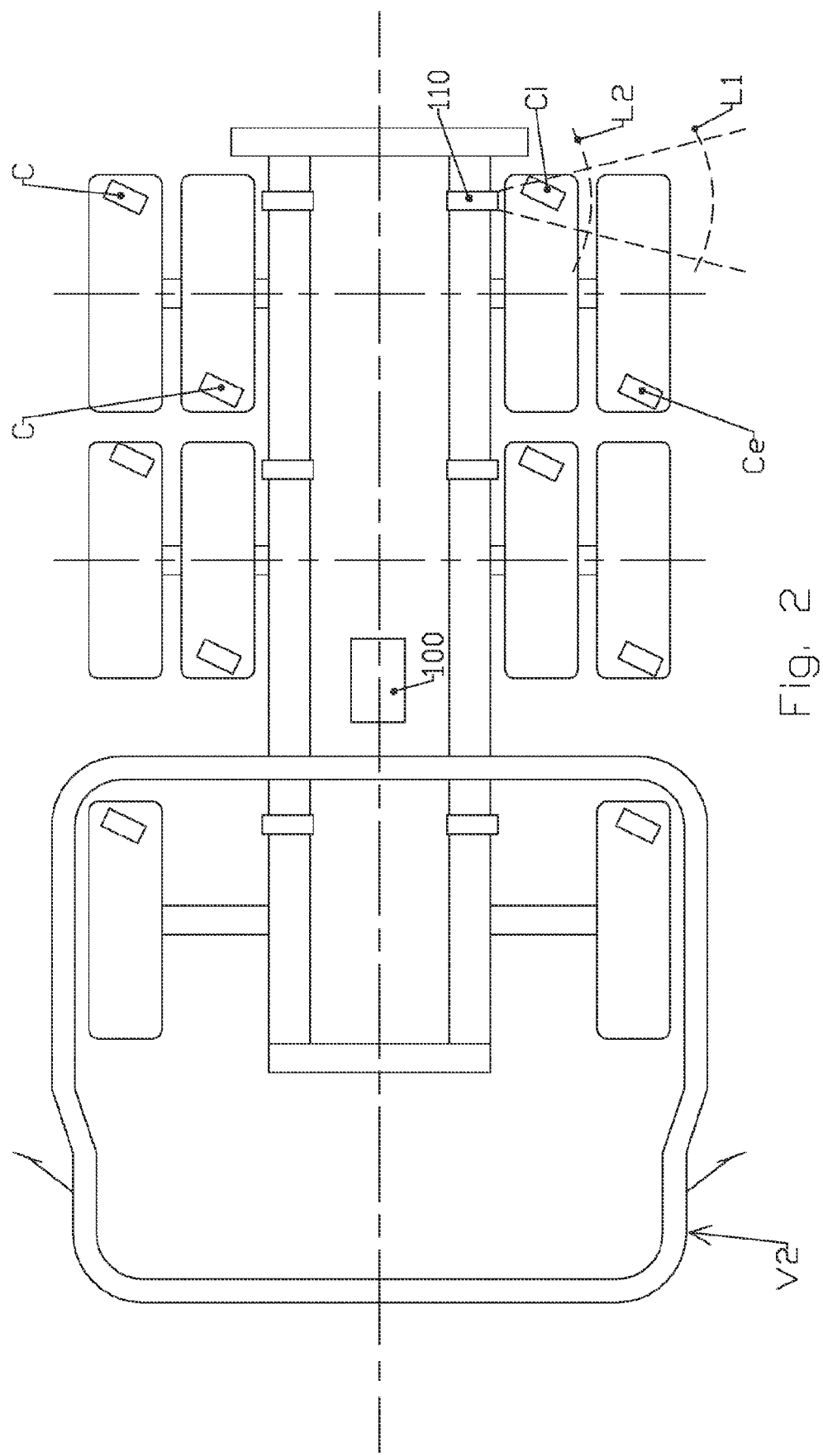
FIG. 2 shows an application of the method for a vehicle having twin wheels.

The other application of the method of the invention shown in the drawing in FIG. 2, relates to twin wheels. The vehicle V2 is provided with an information taking system associating in each wheel R, a sensor provided with a subassembly for transmitting the collected information to a module for transmitting and receiving said collected information 100, said module being associated to the frame of the vehicle V2 and provided with a plurality of transmission antennas 110 arranged on the frame in the vicinity of each axle end. Indeed, in this application as explained in the description of prior art, it is difficult for the module for transmitting and receiving to differentiate the data coming from the sensor Ci placed in the inner wheel from that of the sensor Ce placed in the outer wheel even when the radiation lobe of the transmission antenna of the interrogation signal 110 is limited. Also, in accordance with the method of the invention, the gain of the antenna 110 will undergo a decrease in order to switch from a range of radiation wherein the broadcast lobe L1 encompasses the two sensors Ci and Ce until a range of radiation wherein the broadcast lobe L2 encompasses only a single sensor Ci. The module for transmitting and receiving can then deduce the origin of the data that it receives from this antenna. According to an embodiment not shown, the device comprises a single antenna for each axle supporting twin wheels.

Figure 3:
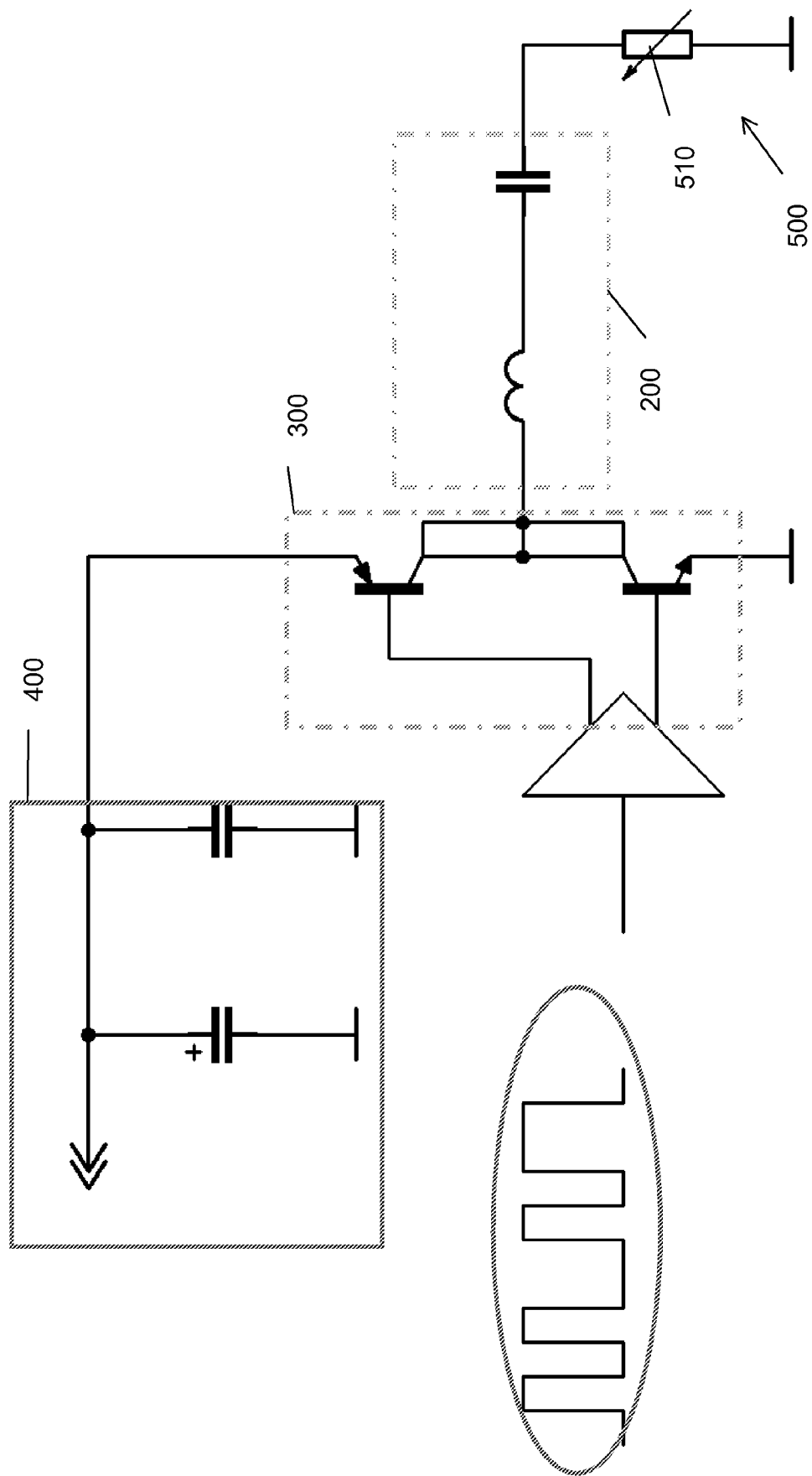
FIG. 3 shows an embodiment of the device making it possible to implement the method.

FIG. 3 shows an embodiment of an electronic mounting making it possible to vary the power of the antenna which is of the low frequency type.

This antenna 200 is linked to a stage of amplifying data 300, a stage of supplying and of filtering 400 and a stage of varying the power 500. In accordance with the invention, this stage of varying the power is comprised of a variable resistor 510 of which the controlled variation will allow the field of radiation of the antenna 200 to be increased or decreased.

According to the embodiment shown, the stage of supplying and of filtering comprises a polar capacitor and a capacitor. The stage of amplifying comprises a PNP transistor and an NPN transistor.

It is understood that the method and the device, which have just been described and shown hereinabove, were described and shown for the purposes of a disclosure rather than a limitation. Of course, various arrangements, modifications and improvements can be made to the example hereinabove, without however leaving the scope of the invention.

The invention claimed is:

1. A method of identifying sensors of a sensor set of an information system for a vehicle including a frame and a plurality of wheels, the sensor set including a plurality of sensors housed in the wheels, each sensor being provided with a subassembly for transmitting collected information, the method comprising:
   detecting a first signal-set received from the sensor set;
   subsequently, varying power of a transmission antenna;
   subsequently, detecting a second signal-set received from the sensor set;
   identifying a signal present in one of the first and second signal-sets and not present in the other of the first and second signal-sets; and
   associating the signal, identified in the identifying step, with one of the sensors in the sensor set.

2. A method according to claim 1, further comprising arranging the transmission antenna in such a way that the sensors are positioned at a different distance from the antenna.

3. A method according to claim 1 wherein the varying step includes varying the Q-factor of the transmission antenna.

4. A method according to claim 1 further including coupling the transmission antenna to the frame of the vehicle.

5. A method according to claim 4 further comprising arranging a plurality of antennas on the frame in the vicinity of each axle end supporting twin wheels.

6. A method according to claim 4 further comprising arranging a single antenna for each axle supporting twin wheels.

7. A method according to claim 1 further including coupling the transmission antenna to a portable case that is not coupled to the frame of the vehicle.

8. A method according to claim 1 wherein the varying step includes increasing the power of the transmission antenna, and the identifying step includes identifying a signal present in the second signal-set and not present in the first signal-set.

9. A method according to claim 1 wherein the varying step includes decreasing the power of the transmission antenna, and the identifying step includes identifying a signal present in the first signal-set and not present in the second signal-set.

10. A method according to claim 9 wherein an axle end is provided with twin wheels, an inner wheel and an outer wheel, wherein the associating step associates the identified signal with the sensor of the inner wheel.

11. A method according to claim 1 wherein the associating step is performed without using an encoding technology.

* * * * *